(No Model.) 2 Sheets—Sheet 1.
L. A. BERTELING.
COMPOUND OPTOMETERS.
No. 263,674. Patented Sept. 5, 1882.
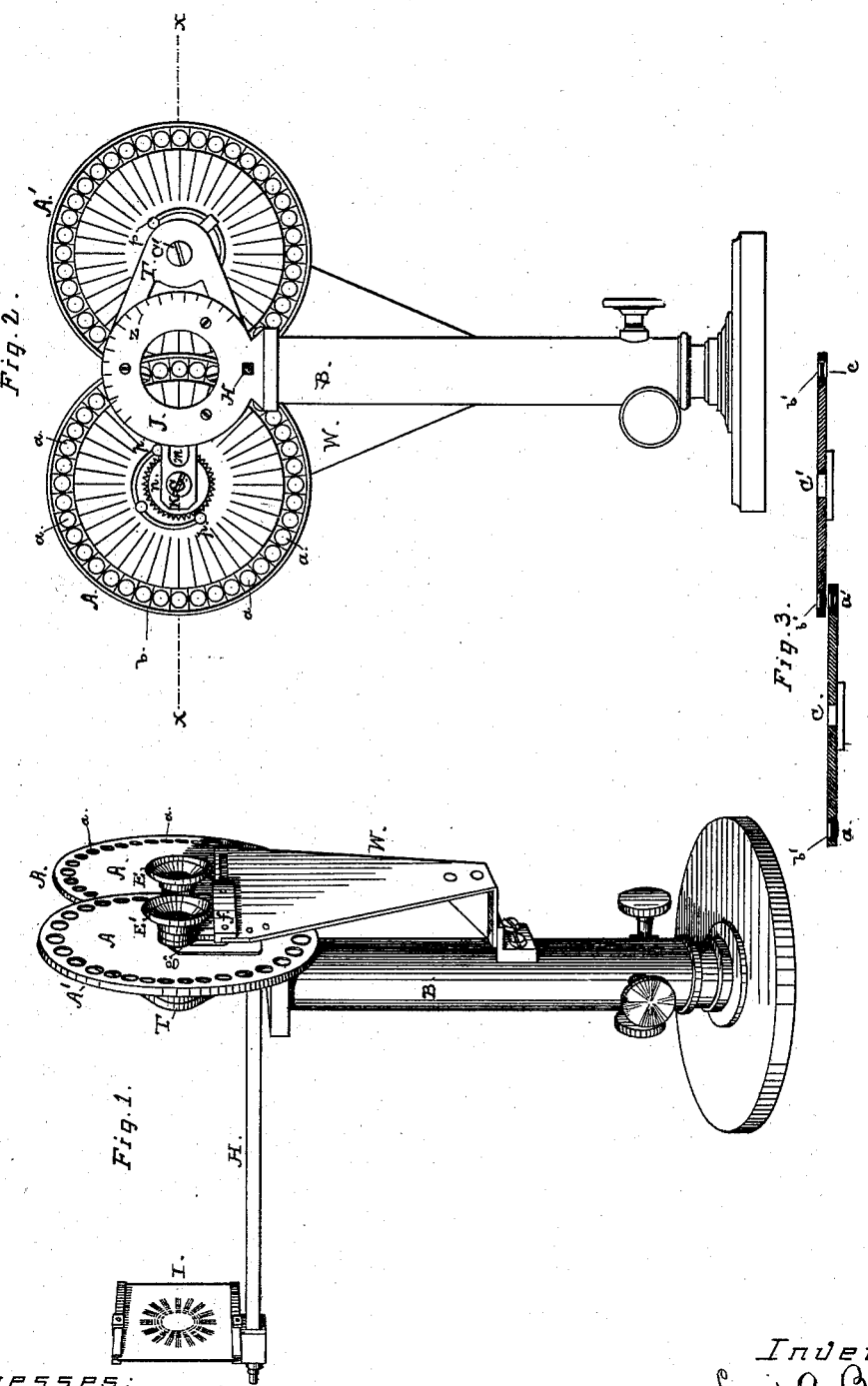
Witnesses:
Wm Voit
Geo Vincent
Inventor:
Louis A. Berteling
By his Atty.,
Edward E. Adams

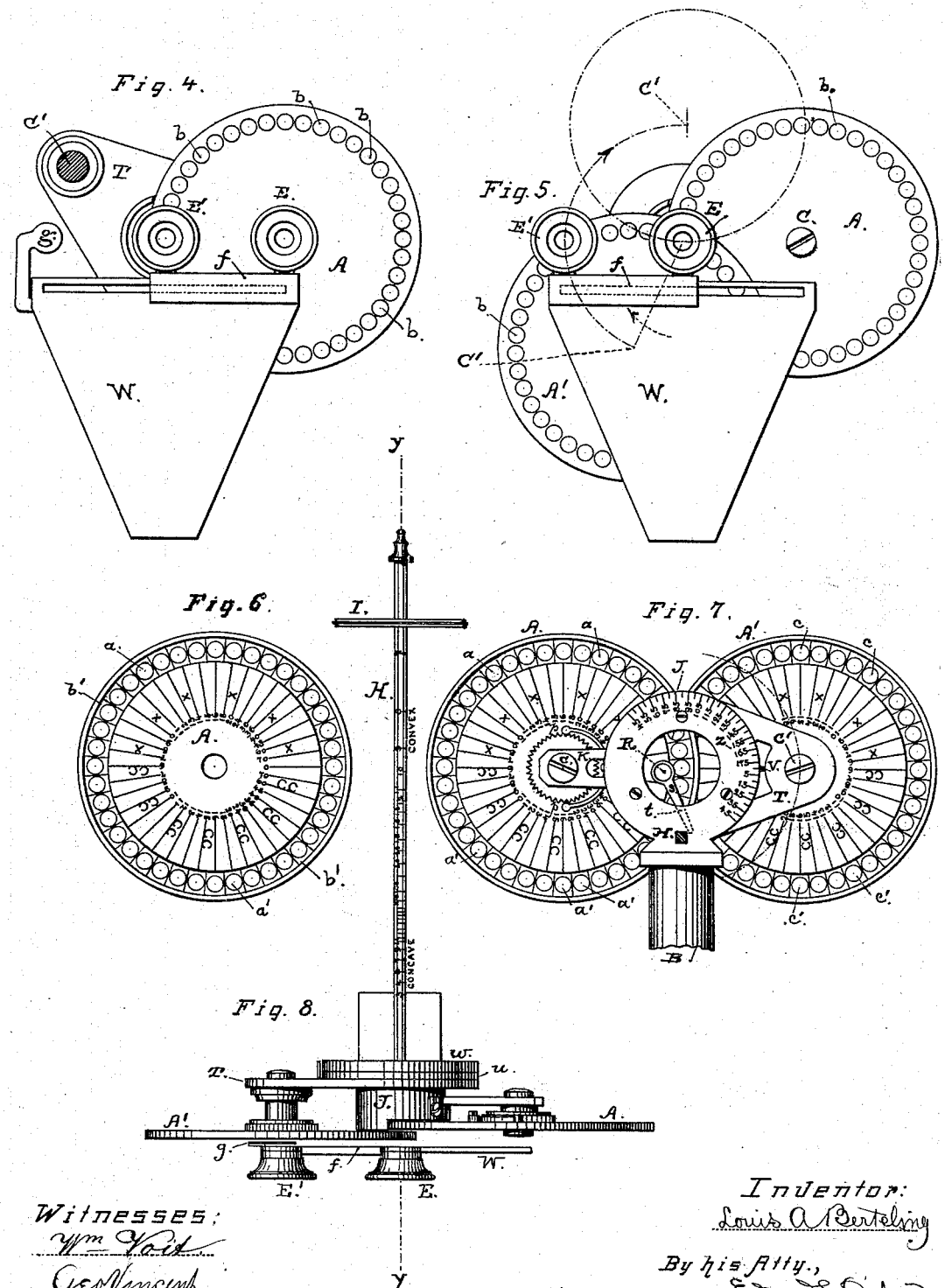

UNITED STATES PATENT OFFICE.

LOUIS A. BERTELING, OF SAN FRANCISCO, CALIFORNIA.

COMPOUND OPTOMETER.

SPECIFICATION forming part of Letters Patent No. 263,674, dated September 5, 1882.

Application filed November 11, 1881. (No model.)

*To all whom it may concern:*

Be it known that I, LOUIS A. BERTELING, of the city and county of San Francisco, in the State of California, have made and invented certain new and useful Improvements in Compound Optometers; and I do hereby declare that the following is a full, clear, and exact description of the same, reference being had to the accompanying drawings.
My invention relates to certain improvements in instruments or apparatus for the use of opticians and oculists, and generally known as "optometers," "opsiometers," and "astigmatism apparatus." It includes an improved optometer for detecting imperfect and defective vision, and for adjusting to cases of near-sightedness and far-sightedness the form and power of spherical lens required for their cure or relief. It also includes novel parts, devices, or mechanism in connection and combination with such instrument, by the application and co-operation of which any amount and character of astigmatism can be ascertained and accurately determined, and at the same time the form and power of lens best adapted for the relief or cure of the case under examination will be indicated by the instrument, all which will be hereinafter fully described and set forth.

In the accompanying drawings, herein referred to for a better understanding of the nature, application, and operation of my improvements, Figure 1 is a perspective view, showing the general construction and application together of the parts and devices producing an astigmatism apparatus as well as an optometer. Fig. 2 is an elevation taken from the front of the instrument or apparatus. Fig. 3 is a horizontal section taken across the center of the two disks containing respectively the spherical and the cylindrical lenses, which, when employed and arranged together in this manner, constitute a complete astigmatism apparatus. This section is taken through the line *x x*, Fig. 2. Fig. 4 shows the operative parts of the instrument as combined together without the disk of cylindrical lenses to form a simple optometer for detecting and determining defective vision, and for ascertaining the proper lens to be applied in any case where astigmatism is not indicated. Fig. 5 shows the combination and operation, with the spherical lenses, of the disk carrying the cylindrical lenses. It illustrates the manner in which the axis of any cylindrical lens of the series is changed and brought into any angle from vertical to vertical at the eye-piece of the instrument. The full and the dotted lines show two positions of the cylindrical-lens disk, while the broken line shows the path described by the center or axle of the disk in its movements about the eye-piece. Fig. 6 is a view of one of these lens-carrying disks. Fig. 7 shows the two disks with spherical and cylindrical lenses, and the application thereto and combination therewith of the removable lens or glass of fixed power. Fig. 8 is a top view of the complete instrument without the supporting base or stand.

In a disk, A, formed preferably out of sheet metal, I fix a series of spherical lenses, $a\ a\ a$ $a'\ a'\ a'$, in close concentric row at or near its rim. These lenses are placed in regular succession as to their strength or power, beginning with zero or a plain glass, and increasing by whole numbers or degrees, or fractions of the same, up to the highest power required, one half of the entire circle containing lenses of the convex order, $a$, and the remaining half composed of lenses of the concave order, $a'$.

Around one half of the circumference therefore are placed convex lenses, while in the other half are placed the concave lenses, and all the powers required for use in both orders are provided in the one disk. On the front of this disk, at or in line with each lens, is marked or indicated by letters and figures the kind and power of each lens, as is seen in Figs. 6 and 7 of the drawings. In fixing these lenses in place I form a row of apertures, $b$, in a circle around the disk and concentric with the center, and in the front face of the disk I make a circular groove, recess, or channel, $b'$, into which I set the lenses $a\ a\ a'\ a'$, and secure them permanently in place by cement. The lenses are cut or ground to fit against one another and into this channel in an accurate manner, the center of each lens being on a line passing across the face of the disk through the center of the aperture $b$ and the center of the disk, so that the centers of all the lenses shall be equidistant from the axis on which the disk turns. I mount this disk A, with its series of spherical lenses, upon the horizontal pivot or axle C, projecting from an upright frame or standard, B, and behind it I fix an eye-piece or sight-tube, E, in such position that the center of the aperture through this tube shall pass through the circle in which are placed the centers of the series of lenses $a$ $a$ $a'$ $a'$, &c. Any rotation of the disk A upon its center C will then bring the lenses, one after another, into position exactly in front of the eye-piece E, and either the convex or the concave lenses can be brought into use, as required, in order or succession, governed by the direction of the rotation given to the disk.

The eye-piece E is a cup-shaped short tube fixed on a bracket or support just behind the disk A in the position as described and shown; but for convenience in using and applying the instrument, as well as to secure more accurate results in its operation, I prefer to fix two of such eye-pieces, E E', at the proper distance apart upon a sliding bar or plate, $f$, and then provide at one side of the frame and in line with the aperture of the tubes a closing-plate or shutter, $g$, as shown in Fig. 4 of the drawings, so that when one eye of a person is being examined and tested the light will be shut off and excluded from the other eye through the second tube and this shutter. Thus by the position of the tubes E E' in Fig. 4 the left eye will have the sight directed through the lens in the disk, while the right eye, being covered by the tube E', will be practically closed, as the vision will be shut off by the face of the disk lying across the tube-aperture; but to test the right eye the slide $f$ will be moved to the left to bring the tube E' into line and position with the lenses of the disk, and in this adjustment of the tubes the left one, E, will come in line with and be closed by the shutter $g$.

From the front of the instrument and in line parallel with the line of sight through the lenses at the eye-piece I carry out a horizontal bar or rod, H, upon which I provide a graduated scale of focal distances, both near-sighted and far-sighted, so that by means of a sliding target or object-piece, I, capable of being moved along and set at any point on the length of the bar, I can measure the focal distance of an eye and determine the character and amount of the defect or departure from a normal condition of sight.

In the construction shown in Figs. 1, 2, and 7 of the drawings the post or standard B, rising from the base-plate, has a cylindrical block, J, on its top, which forms a support for the bracket or arm K, carrying the pivot of the disk H, and it also has the graduated bar H, fixed to and extending forward from it. The central circular opening through this block permits the object held on the target I to be viewed through the eye-piece without obstruction, as seen in Figs. 2 and 7. The arm K, supporting the pivot of the disk A, is held to the block by a set-screw working through a slot, $m$, in the arm, by which lateral adjustment of the disk is made to bring the centers of the lenses directly upon the line of sight or axis of the eye-piece E. The notched wheel $n$, fixed to the pivot $c$ at the side of the disk, is provided for the purpose of holding the disk from turning too easily on its pivots, so that any particular lens brought into position is held steadily in place at the eye-piece and in true line with its aperture. The two spring-arms or pawls $p$ $p$, extending from the face of the disk A, embrace the wheel and press against and engage with its notches on opposite sides.

An optometer of such construction will have the capacity to test and measure all grades and conditions of near-sightedness and far-sightedness, as it combines in one instrument, in simple and compact form and arrangement, all the orders and powers of lenses required by the optician.

Now, it will be evident that in such an instrument by interposing between the target or object of the instrument and the lens in use at the eye-piece a simple lens or glass of a certain definite power the strength of the lens in the disk can be increased or diminished in a certain proportion, and by this means I can so change the action of the spherical lens upon the sight that the target or object will not be in distinct vision to the person at the tube until a spherical lens either of higher or lower power is substituted for the lens in use. Therefore by bringing in front of the spherical lens at the eye-piece this removable lens or glass of fixed power I am enabled to determine the difference between the power of lenses required for reading or near observation and the power to be adjusted to the same eye for seeing at a distance simply by rotating the disk A until the lens of required power is brought into line with the eye-piece and the auxiliary lens R. For convenience of use and application I fix this lens R in a swinging or pivoted frame, $s$, as seen in Fig. 7, so that it can be readily brought to the vertical and in position in front of the spherical lens and as readily turned back when not required. The frame $s$ is pivoted at $t$ to the inner side of the block J, and its lower end extends below the pivot and forms a handle or lever for moving it.

This instrument also includes a means for detecting and accurately determining astigmatism of different character and degree, and where the same is indicated and requires to be tested I employ and combine with the disk A for its examination a series of cylindrical lenses, $c$ $c$ $c'$ $c'$, of both orders, $c$ $c$ representing the convex and $c'$ $c'$ the concave, mounted in a disk, A', of similar construction to the disk carrying the spherical lenses. This disk A', I combine with the disk A in such manner that the two circles in which are set the centers of the lenses $a$ $a$ and the axes of the lenses $c$ $c'$ of the two disks respectively shall overlap or come in line at the eye-piece E, and the center of the lens in one disk shall come exactly over and coincide with the axis of the lens in the other disk. The pivot or axle C' of the disk A' is situated as far from the center of the sight-tube, or the line passing through the center of the spherical lens at that point, as the pivot C of the disk A is distant from the same point, which is the axis $y$ $y$ of the instrument. This combination enables any one of the series of cylindrical lenses to be brought in position behind any spherical lens adjusted at the eye-piece, and the two placed and held for conjoint operation.

The cylindrical lenses $c\,c\,c'\,c'$ are placed in regular order and succession in their disk, with the axis of each one running to the center C' of the disk, and the form and strength of each one are indicated on the front of the disk by letters and figures and index-line $x\,x$ for the convex and $c\,c\,c\,c$ for the concave cylinders, as seen in Fig. 7.

As shown in Figs. 6 and 7, the centers of the disks A A' are provided with a circular scale and radiant lines reaching out to the several lenses around the edge. This scale indicates the power of these lenses, and the radiant lines serve as indices to point to the lenses. The lines $x$ point to the convex lenses and the lines $c\,c$ to the concave.

To provide for setting the axis of the cylindrical lenses to any angle or to the vertical or horizontal with respect to the spherical lens in front of it at the eye-piece, I fix the pivot C', in a swinging or turning arm or plate, T, in such manner that the center of the disk A' can be moved in a circular path, having its center on the line or axis passing through the eye-piece and the lenses $a\,a'\,c\,c'$ in front of it. This arm or plate T extends laterally from a hub or ring, $u$, which turns upon a collar, $w$, or in a groove around the cylindrical block J, and it holds the pivot C' always at the same distance from the center of the aperture through the block J, so that the center of any cylindrical lens at the eye-piece will be retained in true position, while the axis of the lens will change with the movement of the center C' in the circular path, and its angle or inclination across the spherical lens in front of it will be increased or diminished with respect to the horizontal or vertical. To indicate the angle of this inclination of the axis of a cylinder in such adjustment, I fix upon the arm T an index or pointer, V, and around the circumference of the cylinder-block J, I provide a scale of degrees and divisions, Z, by which the position of the cylindrical lens is instantly seen and accurately measured.

By giving the center of disk A' a movement about the axis of the instrument in addition to its rotary movement I am able to make all possible combinations of the cylindrical with spherical lenses, and thus produce a complete practical instrument that operates to determine all grades and conditions of astigmatism, and indicates the proper form and power of lens required by any case under examination.

When it is desired to use the instrument with a single disk, A, again, the second disk, A', is removed from its axis $c'$.

Having thus fully described my invention, what I claim, and desire to secure by Letters Patent, is—

1. In an optometer, the combination of the disk A, carrying spherical lenses $a\,a\,a'\,a'$, and mounted and capable of rotation on a horizontal axis, and the eye-piece or sight-tube E, and movable slide $f$ upon which it is sustained, substantially as hereinbefore described.

2. In an optometer, the combination of the disk A, having the series of spherical lenses, and mounted and capable of rotation on a horizontal axis, the eye-piece or sight-tube E, and the movable auxiliary lens R, of fixed or definite power, substantially as hereinbefore described.

3. In an optometer, the combination, with the eye-piece or sight-tube, of the disk A, with its series of lenses mounted on the adjustable arm K, whereby its center or pivot is capable of lateral adjustment to and from the center or axis of the eye-piece, substantially as hereinbefore described.

4. The combination together, in an instrument or apparatus of the kind described, of a disk carrying a series of spherical lenses and a disk carrying a series of cylindrical lenses, having a swinging movement on its support, so as to change the position of the axes of the lenses, both capable of rotation on a central axle or pivot, and arranged in relative position for operation, substantially as hereinbefore described.

5. In an instrument or apparatus of the kind described, the combination of the disks A A', having the series of spherical and cylindrical lenses, as described, the eye-piece or sight-tube E, the graduated bar or rod H, with adjustable target or object-piece I, and the auxiliary lens R, substantially as hereinbefore described.

6. The combination, in one instrument or apparatus, of a set or sets of spherical lenses of different powers and a set or sets of cylindrical lenses of different powers so applied together for joint operation in front of an eye-piece or sight-tube that any one of the cylindrical lenses can be brought into line and position with any one of the spherical lenses at the eye-piece or tube, with its axis at any desired angle, substantially as hereinbefore described, for the purposes specified.

7. The combination, with the eye-piece or sight-tube, of the set of spherical lenses of both orders, the set of cylindrical lenses of both orders mounted in a rotating frame, arranged and applied for conjoint action and operation, and the auxiliary lens R, adapted to be brought into and out of action with said lenses, substantially as hereinbefore described, for the purposes specified.

8. The combination, with the disk A, carrying spherical lenses, of the disk A', having cylindrical lenses, the center or pivot C' of which is capable of a movement in a curved path around the axis or line of sight, said movement being caused to take place in a circle having its center at the said axis and passing through the center or pivot C', substantially as hereinbefore set forth.

9. In combination with the disk A', carrying cylindrical lenses, and having a movement in a circular path around an eye-piece or tube, E, in addition to its movement of rotation upon its pivot C', a means for indicating the amount or degree of this revolution about the eye-piece, substantially as hereinbefore described, for the purpose set forth.

10. In combination with the fixed support J, having the scale Z, the rotary arm T, with its pivot or axle to carry the disk A', and the index or pointer V on said arm, substantially as hereinbefore described, for the purposes set forth.

11. The slide $f$, having the fixed eye-pieces or sight-tubes E E', and adapted to be moved laterally in front of the disks A A', as described, in combination with the closing-plate or shutter $g$, applied to act substantially as hereinbefore described, for the purposes set forth.

12. The disk A, having the circle of apertures $b$ around its rim, the centers of which are located in a circle having its center at the pivot C', and provided with the channel or groove in its front face, and the letters and figures to indicate the character and powers of the lenses which are fixed in said channel in front of the said apertures, substantially as described.

Witness my hand and seal.

LOUIS A. BERTELING. [L. S.]

Witnesses:
EDWARD E. OSBORN,
GEO. VINCENT.